Patented July 16, 1940

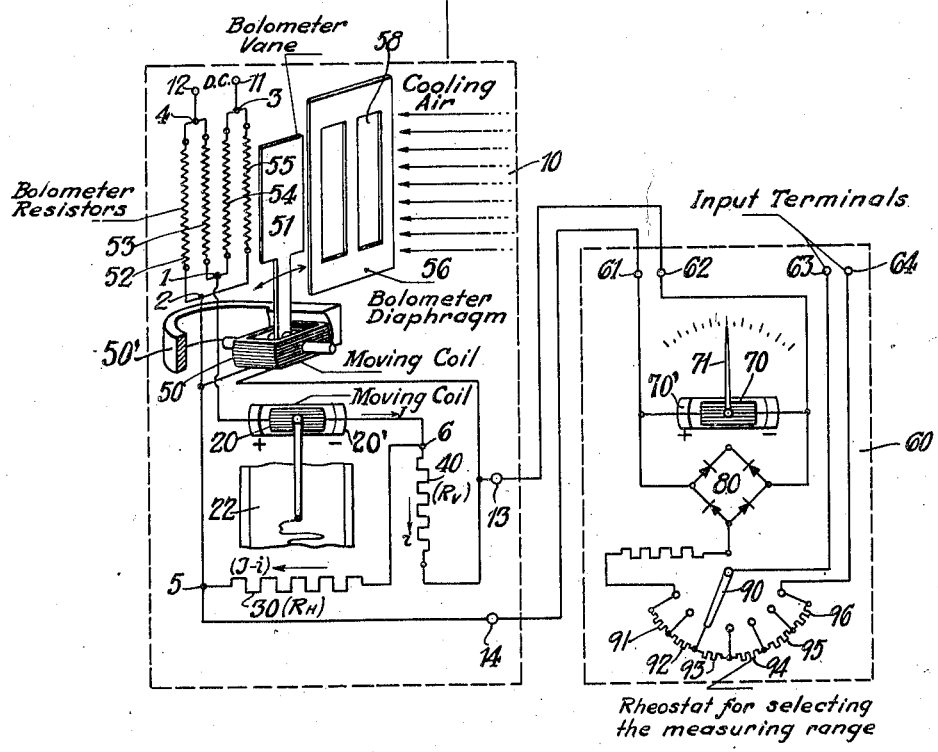
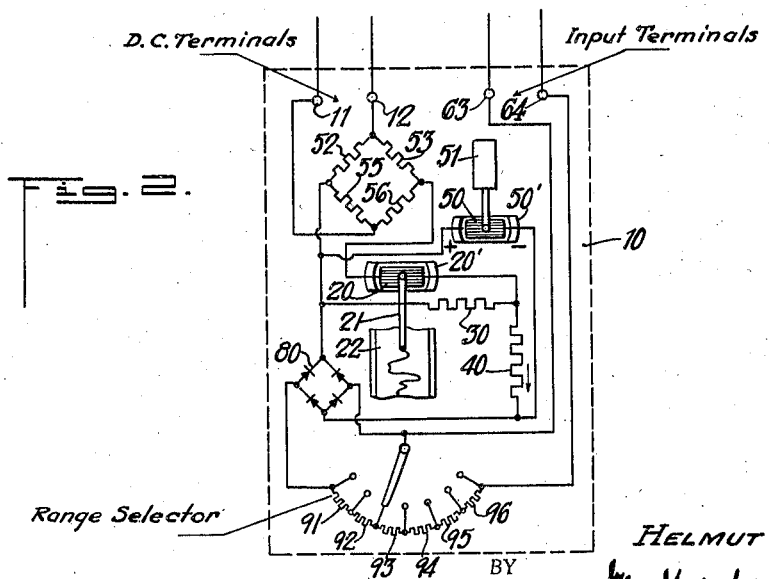

2,207,829

UNITED STATES PATENT OFFICE 2,207,829

RECORDING INSTRUMENT FOR ELECTRICAL MEASUREMENTS

Helmut Sell, Neubabelsberg, near Potsdam, Germany, assignor to Siemens & Halske, Aktiengesellschaft, Siemensstadt, near Berlin, Germany, a corporation of Germany Application October 20, 1937, Serial No. 169,940
In Germany October 24, 1936

8 Claims. (Cl. 171—95)

The present invention relates to improvements in recording instruments for electrical measurements.

The usual recording instruments for electrical measurements, particularly ink writers, have a power dissipation many times greater than that of indicating measuring instruments. While a standard sensitive moving-coil measuring mechanism with scale has a power dissipation of about 1 milliwatt when the pointer deflects to the end of the scale, an ink writer requires about 10 milliwatts. The use of ink writers is, therefore, limited to cases where sufficiently great torque is available. In each case the instrument must be adapted in a particular manner to the purpose for which it is intended. This adaptation refers above all to the moving coil for which resistances of about 1 to 20,000 ohms are usual.

In order to adapt the instrument to further purposes, special auxiliary connections, series resistances and shunts as well as rectifiers for the indication of alternating current may be employed. Series resistances and shunts as generally used in indicating moving-coil measuring instruments in order to adapt a measuring mechanism to a large number of current and voltage measuring ranges for direct current or alternating current, are, as a rule, not suitable for ink recorders owing to the high power dissipation of such recorders. Besides, such arrangements would take up too large a space.

An object of the present invention is to provide an electrical measuring instrument, particularly a recording measuring instrument, which may be adapted to a number of measuring ranges by means of simple auxiliary devices in the same manner as the usual indicating moving-coil measuring instruments are capable of being changed over. Another object of the invention, more particularly, is to provide such an adaptable recorder which has the same power dissipation as usual moving-coil instruments.

According to the invention the measuring or recording mechanism with high power consumption is connected through an amplifier of linear power amplification ratio with a change-over apparatus which contains the necessary auxiliary devices, and the power amplification ratio of the amplifier is adjusted to a constant value in such a manner that the power dissipation corresponds at most to the power dissipation of a standard indicating moving-coil instrument.

To this end, bolometer amplifiers are particularly suitable in which currents of air, which act on a bolometer bridge, are so controlled by a moving-coil measuring mechanism as to influence the bridge balance. Such an amplifier may be so designed that it operates without attendance and presents within the normal fluctuations of the operating voltage a constant amplification with an error of less than 1%. Such an amplifier may be designed within such small dimensions that it may be mounted in the casing of a standard ink writer. In this case, the amplifier may be so designed as to be supplied with energy from the supply circuit or from a battery. The latter form of supply is particularly suitable for portable instruments, which may be fed with energy by a storage battery at a small power dissipation and low voltage.

In some cases, it is advantageous to connect the amplifier to a standard indicating moving-coil measuring instrument provided with the usual auxiliary devices. The amplification is then preferably so rated that the voltage drop is not appreciably increased by the amplifier lying in the circuit of the indicating instrument. In such a case, it is of advantage to connect the indicating moving-coil measuring instrument, provided with the auxiliary devices, to the amplifier in such a manner that the resistance combination is not influenced by the connection of the amplifier when changing the adaptation of the indicating moving-coil measuring instrument from one to another measuring range. This is possible by the use of compensating circuits. Here, a series connection must be employed in the case of a current compensating circuit, and a parallel connection in the case of a voltage compensating circuit. In this case, when changing over the indicating instrument to the individual measuring ranges or to different kinds of current, the indication of the ink writer or the like connected through the amplifier agrees with the indications of the indicating instrument.

The invention will be further understood from the following description of the embodiments illustrated in the accompanying drawings in which Fig. 1 shows in diagrammatic form an ink recorder combined with a bolometric amplifier and connected with an auxiliary device containing an indicating instrument and change-over means for selecting the measuring range, and Fig. 2 shows another embodiment in which a change-over device is directly combined with an ink recorder and a bolometric amplifier within one common casing.

Referring at first to Fig. 1, numeral 10 indicates a unit comprising the following elements. The moving coil 20 of an ink recorder carrying a recording pointer 21 and acting on a recording tape 22, is connected through a resistor 30 to a diagonal point 1 of the bridge arrangement of a bolometric amplifier. The magnet system coacting with the moving coil 20 is represented by a permanent magnet 20'. The bridge comprises resistors 52, 53, 54 and 55, and has its other diagonal (points 3 and 4) connected to terminals 11 and 12 which serve to connect the moving coil 20 of the ink recorder to a direct current source. 50 designates the moving-coil and 50' the appertaining magnet of a measuring mechanism which forms part of the bolometric amplifier. The coil 50 carries a vane 51 for thermically controlling the bolometer bridge. When the amplifier is in operation, the resistors 52, 53, 54 and 55 are exposed to the cooling influence of an air stream produced by an air blower of any appropriate type (not shown). A diaphragm 56 having slots 58 serves to restrict the air current. While in the schematical illustration of the temperature-responsive resistors 52, 53, 54 and 55, the vane 51, and the diaphragm, these elements are shown at relatively large distances from one another in order to render the diagram more easily understandable, it should be noted that in reality these elements are much closer together and form a compact bolometric unit. The resistance of the resistors heated by the current flowing therethrough varies greatly according to their temperature, and therefore depends on the cooling effect of the air current. When the vane 51 is in neutral position, both pairs of resistors 52, 54 and 53, 55 are cooled to the same degree. When the vane 51 moves in either direction, one set is cooled more than the other and the resistances vary accordingly. As a result, very feeble currents actuating coil 50 and vane 51 suffice to bring about corresponding changes of the diagonal voltage between points 1 and 2 of the bridge and of the comparatively great current intensities passing from the terminals 11 and 12 through the bridge to the moving coil 20 of the ink recorder, i. e., an effective amplification is produced. This principle of amplification and a similar bolometric resistor-and-vane arrangement are described in my U. S. Patent No. 1,944,721. The use of a bolometric amplifier in arrangements according to the invention has the advantage over other types of available amplifiers that it allows obtaining extremely small dimensions of the arrangement and that it may easily be operated with low direct-current voltages which facilitates constructing portable instruments.

Moving coil 50 is mounted in such a manner as to be as free as possible of mechanical directing forces, i. e., any biasing spring for holding the coil in a neutral position is to be kept so feeble that its directing force is negligible as compared with the torque originating from the electric currents. Coil 50 has one end directly connected with terminal point 5 of resistor 30, while the other end is connected with the other terminal point 6 of resistor 30 through a second resistor 40. Besides, the ends of the moving coil 50 are directly connected with the input terminals 13 and 14 of unit 10.

The second unit 60 consists of a standard indicating instrument of the moving-coil type which is equipped with means for selectively changing the measuring range. The moving coil of this instrument is indicated by 70, its pointer by 71 and its magnet system by 70'. The moving coil 70 is connected with a set of rectifiers 80, and with output terminals 61 and 62 which are connected with the terminals 13 and 14 of unit 10. The instrument 60 further contains a selector comprising a slide contact 90 and a set of series resistances 91, 92 through 96, and input terminals 63 and 64 to be supplied with the current to be recorded.

Indicating instruments containing auxiliary means as shown within the enclosure 60 are known per se, for instance by U. S. Patent No. 1,811,319. Instead of the illustrated form, others may be used, for instance those having selectable shunt resistors if voltages are to be measured.

The measuring instrument 60 by proper adaptation of the resistances of its individual elements is so designed that in the case of a constant deflection of the moving coil, always the same current corresponding to the sensitiveness of the measuring mechanism flows in the moving coil, independently of the measuring range switched in. This current flows through the moving coil 50 of the bolometer amplifier. The movement of the control vane 51 caused by the current brings the bridge out of balance, whereby a corresponding current is passed through the moving coil 20 of the ink recorder. If a current J flows in the moving coil 20, it divides itself into a current $i$ which flows through the resistor 40 and current $J-i$ flowing in the resistor 30. The current $J-i$ produces in the resistor 30 a voltage drop $(J-i)R_n$, if $R_n$ is the ohmic value of the resistor 30.

The moving coil 50 now moves so long as the voltage acting thereupon departs from the zero value and remains therefore in a position in which this voltage is equal to zero. The zero value occurs if the voltage drop across the resistor 30 is equal to the voltage drop across the resistor 40. Since the latter is traversed by the current $i$, the corresponding voltage drop is $i.R_v$, if $R_v$ is the ohmic value of the resistor 40. The following equation is then obtained:

$$(J-i).R_n = i.R_v$$

or $$J = i \cdot \frac{R_n + R_v}{R_n}$$

If, for instance, the consumption of current of the indicating instrument enclosed by 60 amounts to 0.3 milliampere for the end deflection and the consumption of current of the ink recorder amounts to 15 milliamperes, the amplifier will be adjusted to 50 times the normal current amplification. To this end, the resistances 30 and 40 will be rated for 1 and 50 ohms respectively. In this manner, the deflection of the inker measuring mechanism 20 is proportional to that of the indicating measuring instrument 70, independently of the adjustment of the measuring range selector 90.

This is due to the fact that in the present case of a current compensating circuit, the resistance of the current branch series-connected to the measuring mechanism of the indicating instrument is always adjusted to the zero value automatically. However, if a voltage compensating circuit is employed in which the resistance of the corresponding current branch is always adjusted to the value ∞ automatically, the current branch must be parallel-connected to the measuring mechanism of the indicating instrument in order to avoid during the change-over an influencing of the resistance combination.

An auxiliary indicating instrument 70, 71 may be dispensed with and the bolometer amplifier may be directly connected to the auxiliary devices for changing over to the different measuring ranges. In this case, it is further possible to arrange the means for selecting the measuring range within the casing 10 of the ink recorder.

An embodiment of this type is shown in Fig. 2. The instrument 10 contains input terminals 63 and 64 to be connected with the circuit, the current of which is to be measured, and terminals 11 and 12 for connecting an auxiliary direct current source furnishing the current for operating the ink recorder. Since the individual elements are numbered identically with the corresponding elements of Fig. 1, the arrangement of Fig. 2 and its function will be easily understood from the foregoing explanations made of Fig. 1. The bolometric amplifier of Fig. 2 also has the same construction already described with reference to Fig. 3.

The invention is also applicable if instead of an ink recorder another apparatus of relatively high power consumption is employed which is to be adapted to different selectable ranges of input currents or voltages.

I claim:

1. In an electric measuring system for operating a recording mechanism in proportion to input magnitudes furnishing a power lower than the power consumption of the mechanism, in combination, variable resistance means for selectively adapting the system to different measuring ranges, said resistance means having terminals for supplying the magnitude to be measured, an amplifier having a movable control member, an input circuit for actuating said control member, said input circuit being connected with said variable resistance means, and an output circuit connected with said recording mechanism, said output circuit comprising means for supplying auxiliary power to said mechanism and means controlled by said movable member for varying said power, a resistance arrangement connected with said input circuit and said output circuit and interlinking said two circuits so as to form a balancing network for compensating the effect of said magnitude on said input circuit by a counter-magnitude caused by said output circuit when said movable control member is deflected in proportion to said magnitude.

2. In a system for determining an electric magnitude, in combination, a mechanism to be operated in response to said magnitude and having a high power consumption as compared with that furnished by said magnitude, a change-over device connected with said mechanism for selecting its measuring range in accordance with said magnitude, said device having input terminals for supplying said magnitude, an amplifying arrangement having a movable control member, an input circuit for actuating said control member, said input circuit being connected with said change-over device, and an output circuit connected with said mechanism, said output circuit comprising means for supplying auxiliary power to said mechanism and means controlled by said movable member for varying said power, and impedance means arranged between said change-over device and said amplifying arrangement and connected with said input circuit and said output circuit so as to interlink said circuits to form a balancing network for compensating the effect of said magnitude on said input circuit by a counter-magnitude furnished by said power source through said output circuit when said movable member is adjusted in accordance with said magnitude.

3. In an arrangement for determining an electric magnitude, in combination, two separate units electrically cooperating with each other, one of said units consisting of a moving-coil measuring instrument having input terminals for supplying said magnitude, a resistance device for selecting the measuring range, a moving-coil measuring mechanism and output terminals connected with said mechanism, said other unit containing a mechanism to be operated in accordance with said magnitude and having a high power consumption as compared with that of said first unit, an amplifying system having a movable control member having a power consumption in the order of that of said first unit, an input circuit connected with said control member for operating said member and having input terminals connected with said output terminals of said first unit, and an output circuit connected with said mechanism, said output circuit comprising means for supplying auxiliary power to said mechanism and means controlled by said movable member for varying said power, and impedance means arranged between said change-over device and said amplifying arrangement and connected with said input circuit and said output circuit so as to interlink said circuits to form a balancing network for compensating the effect of said magnitude on said input circuit by a counter-magnitude furnished by said power source through said output circuit when said movable member is adjusted in accordance with said magnitude.

4. In a system for determining an electric magnitude, in combination, a mechanism to be operated in response to said magnitude and having a high power consumption as compared with that furnished by said magitude, a change-over device for adapting the measuring range of said mechanism to said magnitude, said device being designed to be supplied with said magnitude and having a group of resistances and means for varying the effective connections of said resistances, means for supplying an auxiliary current, an amplifying arrangement comprising a balanceable network composed of variable resistances, said network having its input circuit connected with said current supply means and its output circuit connected with said mechanism in order to pass a current through said mechanism in response to an unbalance of said network, and movable control means forming part of said amplifying arrangement for varying the balance conditions of said network, said control means having a power consumption in an order of magnitude of at most that of a usual indicating measuring instrument of the moving-coil type and being connected with said change-over device so as to be operated by the magnitude to be determined after its passage through said device, and an impedance combination arranged between said change-over device and said amplifying arrangement and interlinking said input circuit and said output circuit so as to form a self-balancing system wherein the effect of said magnitude on said control means is balanced by a counter-magnitude furnished by the current in said output circuit.

5. In a system for determining an electric magnitude, in combination, a mechanism to be operated in response to said magnitude and having a high power consumption as compared with that furnished by said magnitude, a change-over device for adapting the measuring range of said mechanism to said magnitude, said device having input terminals for supplying said magnitude, means for supplying an auxiliary current, a bolometric amplifier comprising a bridge arrangement of thermo-responsive resistors, said bridge having its input diagonal connected with said current supply means and its output diagonal connected with said mechanism, control means for varying the thermal conditions of said bridge arrangement, said control means having a moving coil forming the operating element of said control means and having a power consumption adapted to said magnitude to be determined, said moving coil being connected with said change-over device, and a resistance combination connected between said bridge and said change-over device so as to form a balancing network for compensating the effect of said magnitude on said control means when the position of said moving coil is in accordance with said magnitude.

6. In a system for recording an electric magnitude, in combination, a recording mechanism, a resistance device for selecting the measuring range of said recording mechanism, said device being arranged to be supplied with the magnitude to be measured, means for supplying an auxiliary current, a bolometric amplifier having a thermo-sensitive resistance bridge and a movable control member for varying the thermal condition of said bridge, said bridge having an input diagonal connected with said current supply means and its output diagonal connected with said recording mechanism, said control member being connected with said resistance device, a resistor series connected with said recording mechanism and said output diagonal, and a second resistor connected with said first resistor and said control member so as to branch off from a point between said first resistor and said recording mechanism, said second resistor having a higher resistance than said first resistor, the ratio of said resistances being similar to that of the power consumption of said recorder mechanism and said control member.

7. In a system for determining an electric magnitude, a moving-coil measuring instrument of low power consumption designed to be supplied with said magnitude and having change-over means for adapting the measuring range of said instrument to said magnitude, in combination with an apparatus of high power consumption to be adjusted in accordance with said magnitude, a bolometric amplifier having a thermo-responsive resistance arrangement connected with said apparatus and a movable control member for thermally biasing said resistance arrangement, said control member being connected with said measuring instrument and having a power consumption similar to that of said instrument, and a resistance combination interlinking the circuit of said apparatus and the circuit of said control member so as to form a current-balancing network for compensating the effect of said magnitude on said control member by part of the current operating said apparatus when said apparatus is adjusted in accordance with said magnitude.

8. In a system for determining an electric magnitude, a moving-coil measuring instrument of low power consumption designed to be supplied with said magnitude and having change-over means for selecting the measuring range of said instrument, in combination with an apparatus of high power consumption to be operated in accordance with said magnitude, a bolometric amplifier having a thermo-responsive resistance arrangement connected with said apparatus and a movable control member for thermally biasing said resistance arrangement, said control member being connected with said measuring instrument and having a power consumption similar to that of said instrument, a resistor series connected between said apparatus and said resistance arrangement, and a second resistor having one end connected with a point between said first resistor and said apparatus and the other end connected with a point between said control member and said measuring instrument, said second resistor having a higher resistance than said first resistor, and the ratio of said resistances being similar to that of the power consumptions of said apparatus and of said instrument, said two resistors being dimensioned so as to neutralize the effect of said magnitude on said control member when the condition of said apparatus is in conformity with said magnitude.

HELMUT SELL.